United States Patent
Ghosh et al.

(10) Patent No.: US 9,750,052 B2
(45) Date of Patent: Aug. 29, 2017

(54) RANDOM ACCESS TO WIRELESS NETWORK

(71) Applicant: Intel IP Corporation, Santa Clara, CA (US)

(72) Inventors: Chittabrata Ghosh, Fremont, CA (US); Shahrnaz Azizi, Cupertino, CA (US); Eldad Perahia, Portland, OR (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 60 days.

(21) Appl. No.: 14/750,864

(22) Filed: Jun. 25, 2015

(65) Prior Publication Data
US 2016/0381709 A1    Dec. 29, 2016

(51) Int. Cl.
*H04W 74/08* (2009.01)
*H04W 72/04* (2009.01)
*H04W 24/08* (2009.01)

(52) U.S. Cl.
CPC ....... *H04W 74/0833* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 7,965,631 B2 * | 6/2011 | Chin | ............ | H04W 74/085 370/230.1 |
| 8,675,623 B2 * | 3/2014 | Sadek | ............ | H04L 5/0033 370/338 |
| 8,765,632 B2 * | 7/2014 | Zhang | ............ | B01J 23/007 502/104 |
| 9,276,764 B2 * | 3/2016 | Vijayasankar | ...... | H04B 3/542 |
| 2004/0100936 A1 * | 5/2004 | Liu | ............ | H04W 74/085 370/345 |
| 2006/0221992 A1 * | 10/2006 | Chan | ............ | H04L 1/0001 370/445 |
| 2009/0196273 A1 * | 8/2009 | Kwon | ............ | H04W 8/30 370/343 |
| 2010/0080173 A1 * | 4/2010 | Takagi | ............ | H04L 27/0006 370/328 |
| 2015/0103767 A1 * | 4/2015 | Kim | ............ | H04W 74/06 370/329 |

* cited by examiner

*Primary Examiner* — Candal Elpenord
(74) *Attorney, Agent, or Firm* — Schwegman Lundberg & Woessner, P.A.

(57) ABSTRACT

Systems and techniques for random access to a wireless network are described herein. Components of a wireless station may obtain a back-off value. The components may also decode random access resource units from a frame transmitted to the wireless station from an access point of the wireless network. The components may decrement the back-off for each decoded random access frame. The wireless station may select this frame from a sequence of frames when the back-off reaches zero while decoding the random access resource units of this frame. The wireless station then selects the random access resource unit with a more favorable transmission metric than another random access resource unit of the frame and uses the selected random access resource unit to communicate with the access point.

20 Claims, 5 Drawing Sheets

RANDOM ACCESS TO WIRELESS NETWORK

TECHNICAL FIELD

Embodiments described herein generally relate to wireless communications more specifically to random access to a wireless network.

BACKGROUND

Wireless communications often rely on radio transmissions to communicate between two devices. In some wireless systems, a central device manages access for one or more devices. Often the central device will assign radio resources, or otherwise manage the radio resources, to the devices, to improve communication integrity, for example. At times, such as when first associating to the central device, the devices will attempt to access the central device, or the radio resources, without management, in a so-called random access.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Random access techniques may vary, but often include a mechanism to address incompatible use of a radio resource by more than one device. For example, two devices may simply attempt to use the same radio channel at the same time. They both may detect the simultaneous use of the resource, cease using the resource for a random time period, and then attempt to use the resource again.

In wireless systems that conform to the IEEE 802.11 family of standards, the central devices are known as access points (APs) and the devices are known as stations (STAs). The examples below will refer to these entities, however, the disclosed techniques are generally applicable to any ad-hoc access to a limited resource.

The performance of a wireless network can be increased, when there is a large transmit power asymmetry between a station and the access point, by decreasing the bandwidth of transmissions from the STA. For example, the STA may be able to receive 20 MHz transmissions from the AP, but the STA is not able to send 20 MHz transmissions to the AP. This problem may be addressed by permitting the STA to send a low-bandwidth transmission, such as 2 MHz. Transmissions in the 2 MHz bandwidth range are available in IEEE 802.11ax family of standards when orthogonal frequency division multiple access (OFDMA) is used. In this regime, using OFDMA, the AP transmits a trigger frame to allocate resources to the STAs. Individual STAs use an allocated resource (say 2 MHz of spectrum in a particular portion of the channel) to transmit their data back to the AP.

Although OFDMA provide sub-channel communications capabilities, the STA can only transmit a narrow bandwidth signal in response to a trigger frame. However, the AP may not know which STAs, or how many, have data to send. Some of these STAs may only be able to reach the AP using this low bandwidth mechanism (e.g., they are at the edge of their transmission capability).

As noted earlier, a random access technique may solve this problem. However, instead of simply using a time back-off after contention is noted, OFDMA provides an additional complexity of choosing which sub-channel and at what time for the STA to transmit. Moreover, the choice of sub-channel is not simply of identifying a free sub-channel, because different sub-channels may have different transmission characteristics for different STAs. That is, for example, due to sub-channel contention, CSI or transmit SNR is a valuable parameter that should be accounted for within a contention technique. Without using these transmission metrics in the sub-channel contention may result in low system efficiency because an STA with poor channel conditions may have to still transmit their data on an undesirable sub-channel once it wins the contention. The outcome of such a transmission in a sub-channel with low transmit metrics may result in inaccurate packet reception and decoding at the AP, leading to retransmission with higher back-off count (e.g., due to exponential back-off).

Thus, selecting a good sub-channel is also a concern.

To address the issues noted above and to provide low-bandwidth access to an AP for a STA, a particular trigger frame from a sequence of trigger frames may be selected based on a back-off value. Once the particular trigger frame is selected, the resource units (e.g., sub-channels, spatial streams, or other transmission resources) are evaluated to select at one resource unit that is better than another available in the trigger frame. Further, the resource unit evaluation may be limited to random access resource units as designated by the AP. By allowing the back-off procedure to select a trigger frame, rather than the resource unit itself, greater latitude is provided to the STAs to increase their transmission efficacy. Thus, greater reliability and throughput of the wireless network is achieved. Further details are provided below.

Figure 1:
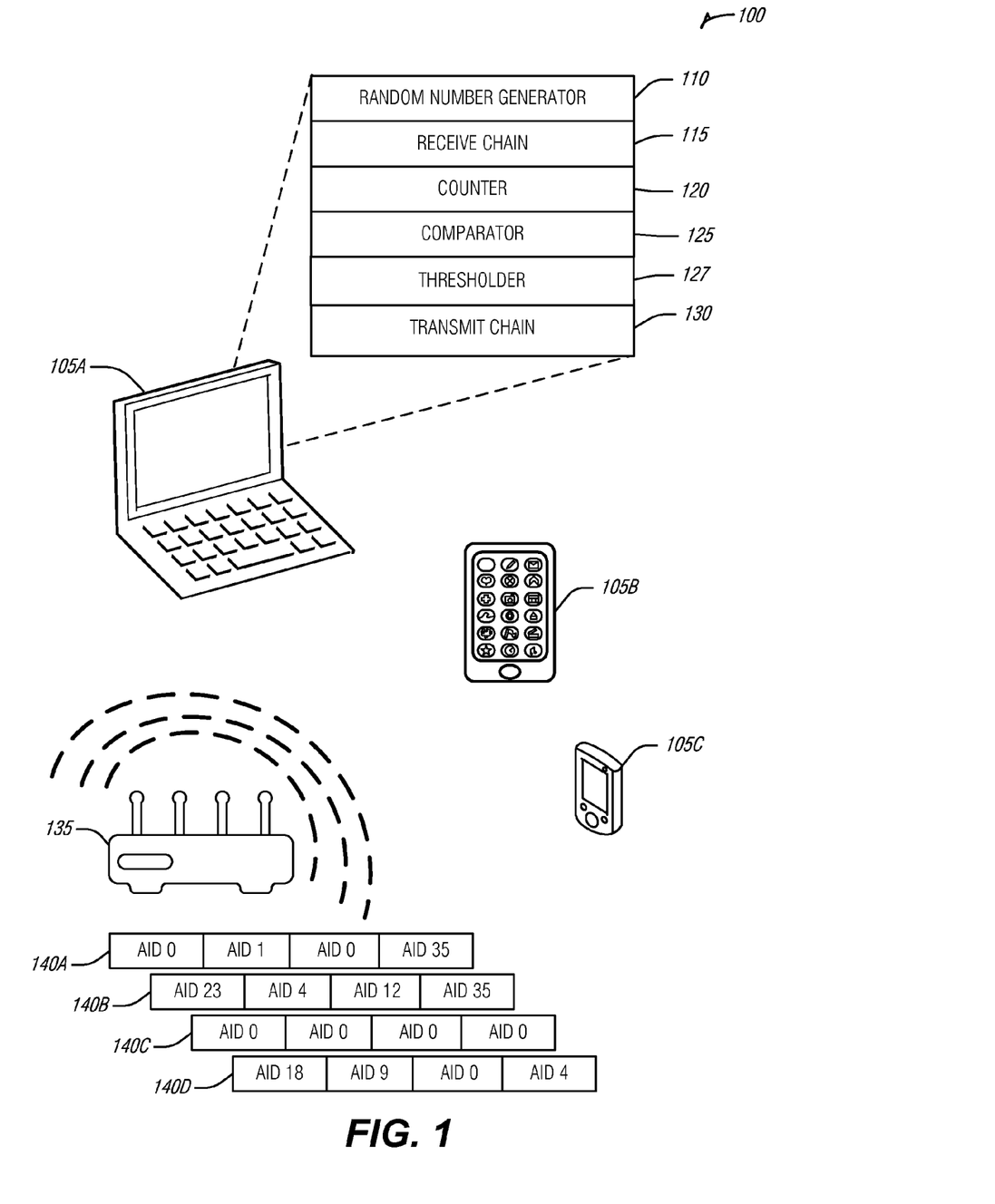
FIG. 1 is a block diagram of an example of an environment including a system random access to a wireless network, according to an embodiment.

FIG. 1 is a block diagram of an example of an environment 100 including a system 105 for random access to a wireless network, according to an embodiment. As illustrated the environment 100 includes multiple STAs 105 and an AP 135. Trigger frames 140 are presented to illustrate a sequence of frames that the AP 135 will transmit. It is noted that the association identification (AID) of the resource units in the triggers frames 140 indicate to which STA 105 the particular resource unit is assigned. Each STA 105 is given an AID upon association with the AP 135. AID 0 is an unassigned. Accordingly, in an example, resource units with AID 0 are designated by the AP 135 as random access resource units.

The STA 105A is illustrated with components 110-130. However, each of the STAs 105 includes similar components. Thus, the STAs 105 include a random number generator 110, a receive chain 115, a counter 120, a comparator 125, and transmit chain 130.

The random number generator 110 is arranged to generate a back-off. In an example, the back-off is generated as an integer between zero and a predefined system value. In an example, the predefined system value is a contention window offset (OWA) attribute of an IEEE 802.11 family of standards.

The receive chain 115 includes radio components arranged to receive or decode radio transmissions from the AP 135. Components can include antennas, filters, and digital components, among others. The receive chain 115 is also arranged to decode resource units from a frame in a sequence of frames 140 (including a single frame sequence) transmitted by the AP 135 to the STAs 105. In an example, resource units are OFDMA sub-channels. In an example, the random access resource units are distinguishable from other resource units in the frame via the AID designated by the AP 135. In an example, a random access resource unit has an AID of zero. In an example, the receive chain 115 is arranged to calculate the transmission metric when a random access resource unit is decoded. In an example, the transmission metric is an SNR. In an example, the transmission metric is another CSI value.

The counter 120 may be initialized to the back-off. That is, the counter 120 may be set to the value of the back-off. In this example, the counter is arranged to decrement the back-off value for each decoded random access resource unit. In an example, the counter counts up from zero (e.g., starts at zero and is incremented) until reaching the back-off. The actual implementation does not affect that the counter maintains the progression of the back-off during processing.

The comparator 125 is arranged to compare, for each decoded random access resource, a first transmission metric of a candidate random access resource in the frame with a second transmission metric of a current random access resource in the frame. That is, the comparator 125 is arranged to compare the transmission metrics of at least two random access resources to determine their relative values. The comparator 125 is also arranged to store (e.g., in a register, buffer, memory, disk, etc.) the current random access resource with its transmission metric as the candidate random access resource when the second transmission metric is better than the first transmission metric. Thus, the better random access resource is kept while the other is no longer of concern. In this way, the selection of the best random access resource unit in the frame, from the transmission metric perspective, is efficiently determined as the decoding of resource units progresses. After the resource units are processed, the last stored random access resource unit is equivalent to the best random access resource unit from the transmission metric perspective.

The thresholder 127 is arranged to determine whether the back-off is exhausted. That is, if the counter 120 is decrementing, whether the back-off reached zero while the last frame was being processed. Conversely, if the counter 120 is incrementing, the thresholder 127 determines whether the counter's value is greater than, or equal to, the back-off.

The transmit chain 130, like the receive chain 115, includes radio components. In this case, however, the transmit chain 130 is arranged to transmit to the AP 135. The transmit chain 130, if the thresholder 127 determines that the back-off is exhausted in while processing this frame, transmits to the AP 135 using the stored random access resource unit to effectuate random access to the wireless network. If, however, the thresholder determines that the back-off is not exhausted, no transmission to the AP 135 will occur. Rather, the STA 105 will wait for another frame and begin the process again. Accordingly, for a second frame that is earlier in the sequence of frames 140, the thresholder 127 is arranged to determine that the counter did not reach zero in the second frame, and the transmit chain is arranged to refrain from using any random access resource in the second frame to communicate with the AP 135.

Figure 2:
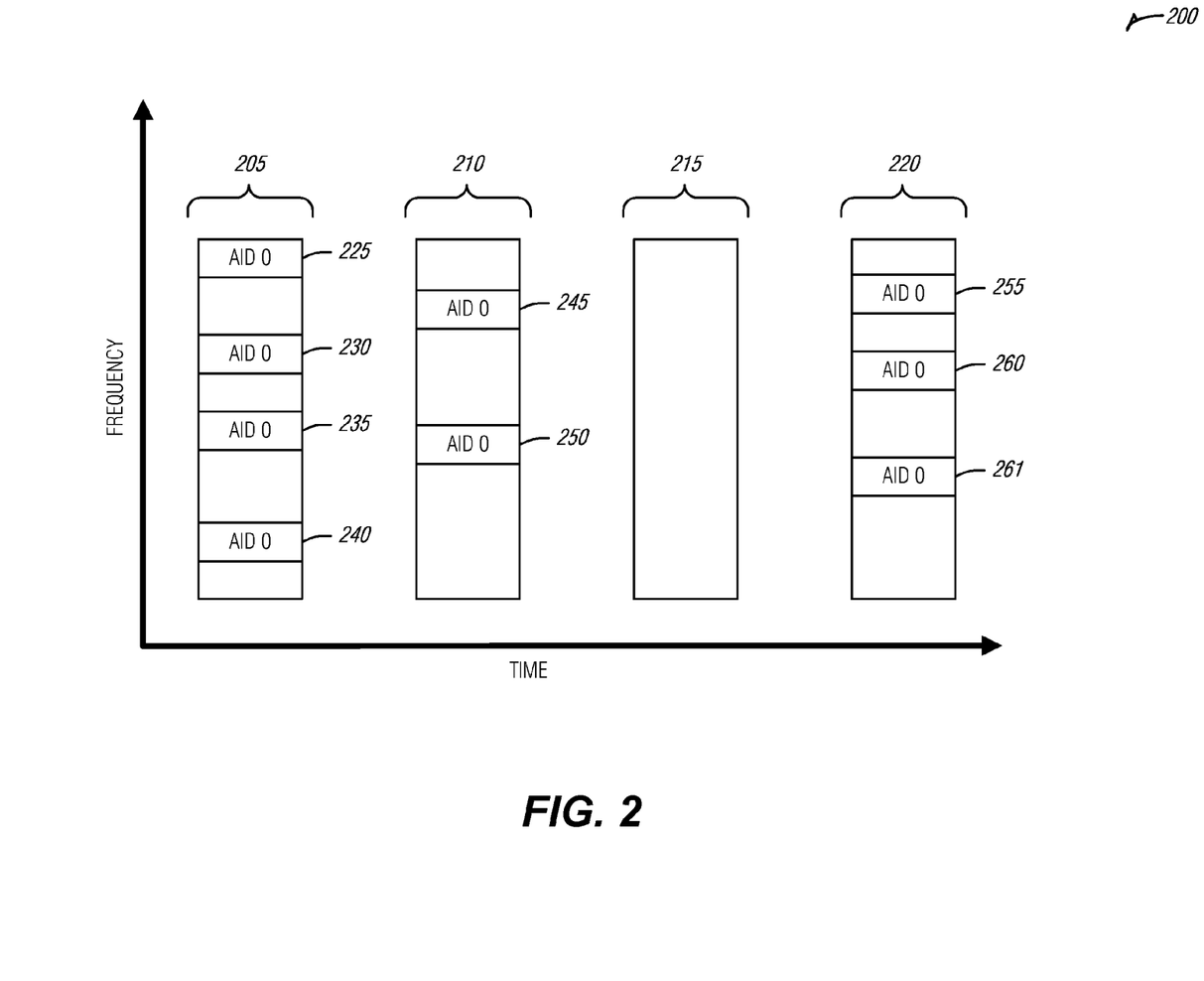
FIG. 2 illustrates an example of resource unit selection for random access to a wireless network, according to an embodiment.

FIG. 2 illustrates an example of a chart 200 for resource unit selection for random access to a wireless network, according to an embodiment. This example involves two STAs (STA 105A and STA 105B) and four trigger frames, frame 205, frame 210, frame 215, and frame 220.

STA 105 randomly selects a number for its back-off count from CWO, ranging between 0 and CWO_min. Once a STA 105 receives a trigger frame it decodes the sub-channels assigned to AID 0 (e.g., specifically allocated for random access by the AP 135).

Each STA 105 now decrements its back-off count by 1 for every random access resource unit (e.g., sub-channel) assigned to AID 0, and also refers to the last transmission metric information measured for the respective random access resource units.

For the first decoded random access resource unit, the STA stores the transmission metric (e.g., transmit SNR or CSI value) and the random access resource unit number in a temporary register. For any successive random access resource unit within the same trigger frame, the STA 105 still performs the Two operations of decrementing its back-off and refers to the last transmission metric for the current random access resource unit. This new transmission metric is compared to that stored in the temporary register. If the new value is greater, the current random access resource unit and associated transmission metric are stored in the temporary register. Conversely, if the new transmission metric<previous transmission metric, the temporary register content remains unchanged. The individual STAs 105 continue these operations until all random access resource units are processed, irrespective of whether the back-off decremented to 0 prior to the last random access resource unit being processed.

If the back-off does not reach zero on random access resource unit in the trigger frame, the STA 105 flushes the contents of the temporary register processes the next received trigger frame. In operation, the above may proceed as follows:

STA 105A selects a back-off of 7 and STA 105B select a back-off of 6. The AP 135 transmits trigger frame 205, which includes random access resource units 225, 230, 235, and 240. As each STA 105A and 105B process these resource units, each measures the respective transmission metric of the resource unit and decrements their respective back-off. Thus, after processing random access resource unit 235, each have decremented their respective back-off's by three and stored whichever of random access resource units 225, 230, or 235 has the best transmission metric for the respective STA 105A and 105B.

Because trigger frame has only four random access resource units, neither STA 105A or STA 105B will reach zero with their back-offs. Thus, each waits until the next trigger frame, trigger frame 210, is received. In this case, STA 105B has a back-off starting at 2 when processing the trigger frame 210 (after starting at 6 and decrementing 4 times for trigger frame 205). Thus, after processing the random access resource units 245 and 250, STA 105B's back-off will be zero. Accordingly, STA 105B has selected the trigger frame 210 and thus will select between random access resource units 245 and 250 to transmit to the AP 135.

STA 105A's back-off is 1 after processing trigger frame 210. Thus, STA 105A waits for the next trigger frame. Trigger frame 215 has no random access resource units and thus STA 105A's back-off will not decrement until the arrival of trigger frame 220. Here, STA 105A's back-off reaches zero at random access resource unit 255. Accordingly, one of random access resource units 255, 260, or 261 will be selected, based on respective transmission metrics, to communicate with the AP 135 by STA 105A.

Again, the devices and techniques described herein solves the problem of a STA transmitting in an random access resource unit with poor transmission metrics when contending for these resources with other STAs. Thus, retransmissions due to random access resource unit selection are reduce because STAs transmit in resource units with the highest measured transmission metrics.

Figure 3:
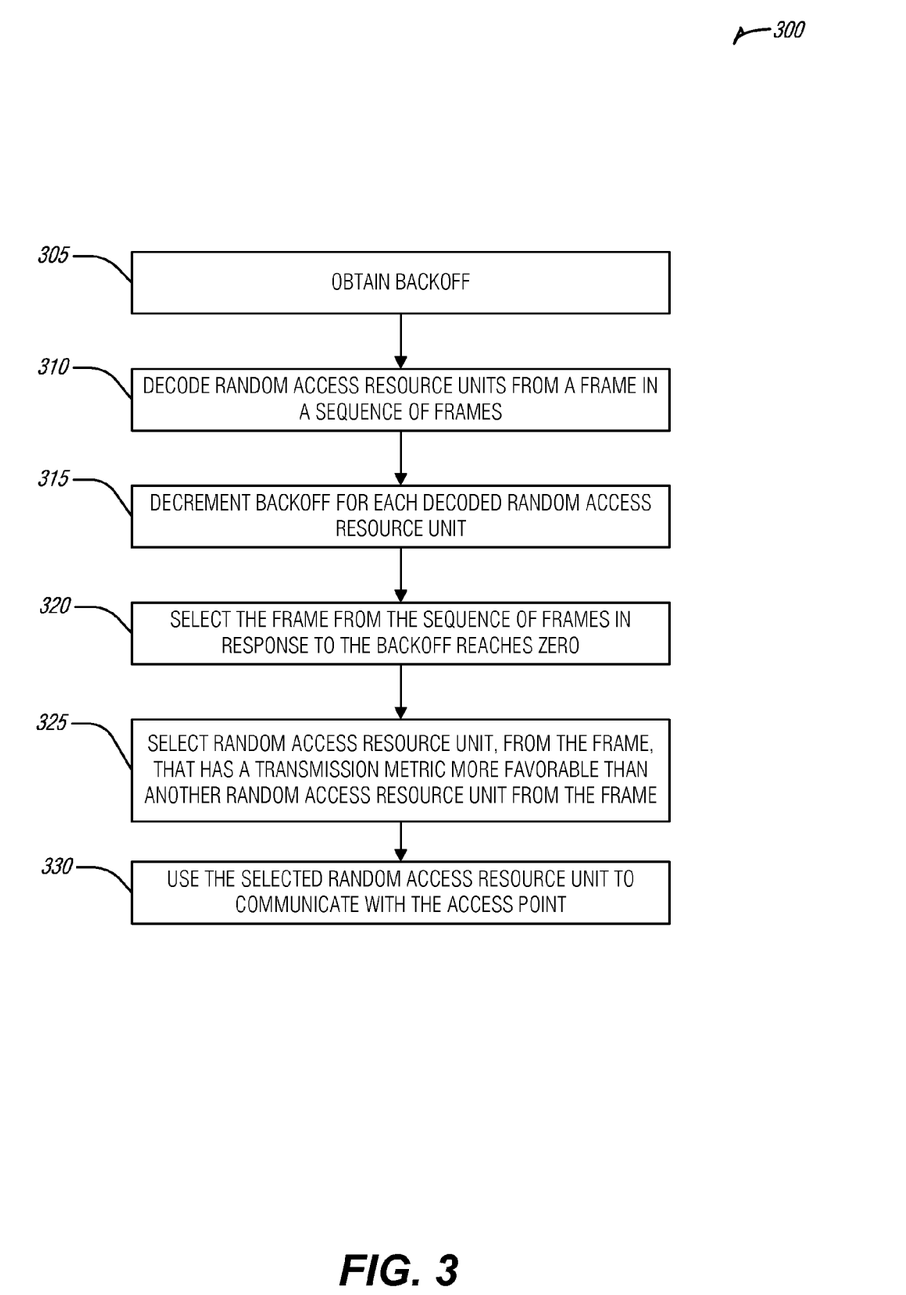
FIG. 3 illustrates a flow diagram of an example of a method for random access to a wireless network, according to an embodiment.

FIG. 3 illustrates a flow diagram of an example of a method 300 for random access to a wireless network, according to an embodiment. The operations of the method 300 are performed by computer hardware components, such as those discussed above with respect to FIGS. 1 and 2, or below with respect to FIG. 5. In the example of method 300, the operations are performed by a STA.

At operation 305 a back-off is obtained by the STA. In an example, obtaining the back-off includes the STA selecting (e.g., generating) a random number. In an example, the random number is an integer between zero and a predefined system value. In an example, the predefined system value is a contention window offset (CWO) attribute of an IEEE 802.11 family of standards.

At operation 310 random access resource units are decoded from a frame in a sequence of frames. The frame is transmitted from the AP to the STA and includes one or more resource units for STA communication. In an example, random access resource units are distinguishable from other resources units in the frame by the assigned association identification (AID). In an example, random access resource units have an AID of zero. In an example, a random access resource unit is an OFDMA sub-channel.

At operation 315 the back-off is decremented for each decoded random access resource unit from the frame. In an example, the decrement occurs as the random access resource unit is decoded. In an example, the decrement occurs using knowledge of the frame contents without decoding the frame contents, for example, received from other signaling or via frame headers.

At operation 320 the frame is selected from the sequence of frames in response to the back-off reaching zero. That is, as each random access resource unit is decoded, the back-off is decremented. If the back-off reaches zero during the decoded of the frames random access resource units, then the frame is selected from amongst other frames in the sequence of frames.

Figure 4:
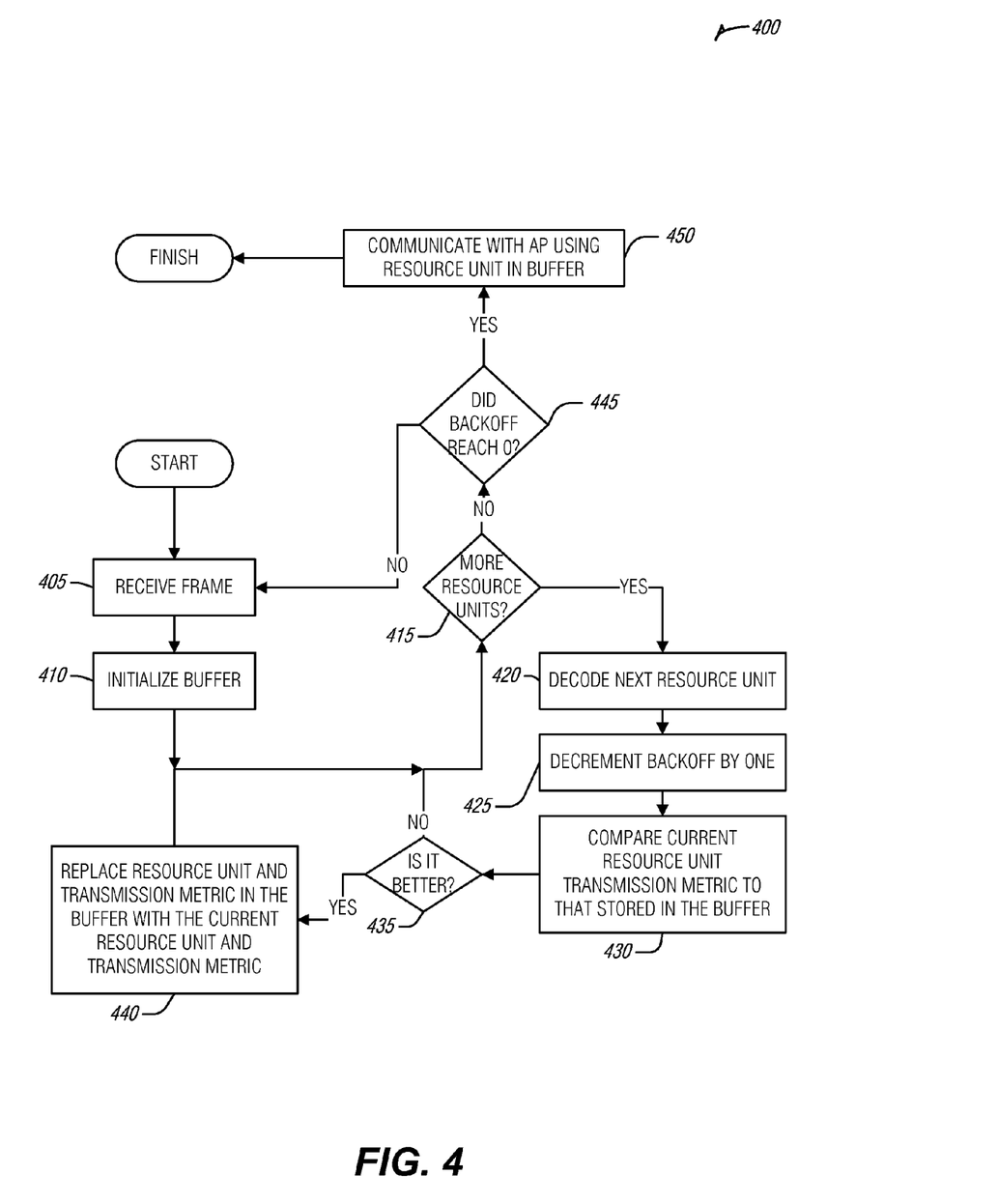
FIG. 4 illustrates a flow diagram of an example of a technique to select a resource unit while decoding resource units in a sequence of frames, according to an embodiment.

At operation 325 a random access resource unit, from the selected frame, is selected. This selected random access resource unit is selected because it has a transmission metric (e.g., channel state information (CSI), signal-to-noise ratio (SNR), etc.) that is more favorable (e.g., for transmission integrity) than another random access resource unit of the frame. Thus, once the frame is selected, the available random access resource units in that frame are evaluated based on transmission metrics and a random access resource unit that is not the worst is selected. In an example, the random access resource unit transmission metric is the best, or equal to the best, random access resource unit transmission metric available in the frame. FIG. 4 illustrate a technique for the inner loop of selecting the specific random access resource unit across frame and within a frame. In an example, the transmission metric is calculated for the random access resource unit as it is being decoded. Thus, the transmission metric value may vary with each successive frame that is received.

At operation 330 the selected random access resource unit is used by the STA to communicate with the AP. Thus, the STA can achieve low bandwidth communication with the AP without AP intervention.

FIG. 4 illustrates a flow diagram of an example of a technique 400 to select a resource unit while decoding resource units in a sequence of frames, according to an embodiment. The technique 400 illustrates one possible way to construct the decision loop used in the method 300. However, one of ordinary skill in the art will understand that other techniques, including buffering, sorting, recursion, etc., may be used to implement the method 300.

The technique 400 starts when the STA attempts a random access to the wireless network facilitated by the AP. The STA selects a back-off value, which may be stored in a register. The STA receives a frame, the first in a sequence of frames (operation 405). Once the frame is received, a buffer (e.g., set of registers) used to select a random access resource from the frame, is initialized (operation 410). The initialized value will be considered empty or evaluate lower than any available random access resource unit in the frame.

During the processing of any given frame, the question of whether there are any further random access resource units to process is decided (decision 415). If the answer is yes, the next resource unit is decoded (operation 420) and the back-off is decremented (operation 425). The current random access resource unit is compared to the buffer (operation 430). If the current random access resource unit is better than the value in the buffer (or the buffer is empty) (decision 435), the buffer is overwritten (e.g., replaced) with the current value (operation 440). The transmission metric of the current random access resource unit is also stored (e.g., in the buffer or another buffer) to facilitate future comparisons between resource units. If the current random access resource unit is not better than the buffer value, the technique 400 proceeds to process remaining random access resource units (decision 415).

After all of the random access resource units are processed (decision 415 NO), the technique 400 proceeds to determines whether the back-off reached zero while processing the current frame. If the answer is no, the technique 400 proceeds to wait for another frame (operation 405), reinitializes the buffer operation 410, and processes available resource units in that frame as described above. Below is example pseudo-code to implement this loop:

```
selectRU (triggerFrame) {
    var buffer = new StaTMRecord(-1, 0);
    // initialize buffer -negative RU id indicates no RU
    for(j=0; j< triggerFrame.RUs.length; j++) {
        back-off--;
        if(buffer.tm < TM(tiggerFrame.RU[j]){
            buffer = tiggerFrame.RU[j]
        }
    }
}
```

Where "TM" or "tm" refers to transmission metric.

If, however, the back-off does reach zero, the STA communicates with the AP using the random access resource unit in the buffer. Thus, the STA chose the particular frame by virtue of the back-off reaching zero while the frame was being processed. As each random access resource unit that is store in the buffer is at least better than any that came before it, the selection of the best random access resource unit is complete after the last random access resource unit is processed form the frame. Thus, the random access resource unit remaining in the buffer provides the best likelihood of a successful transmission (based on the transmission metric) to the AP.

Figure 5:
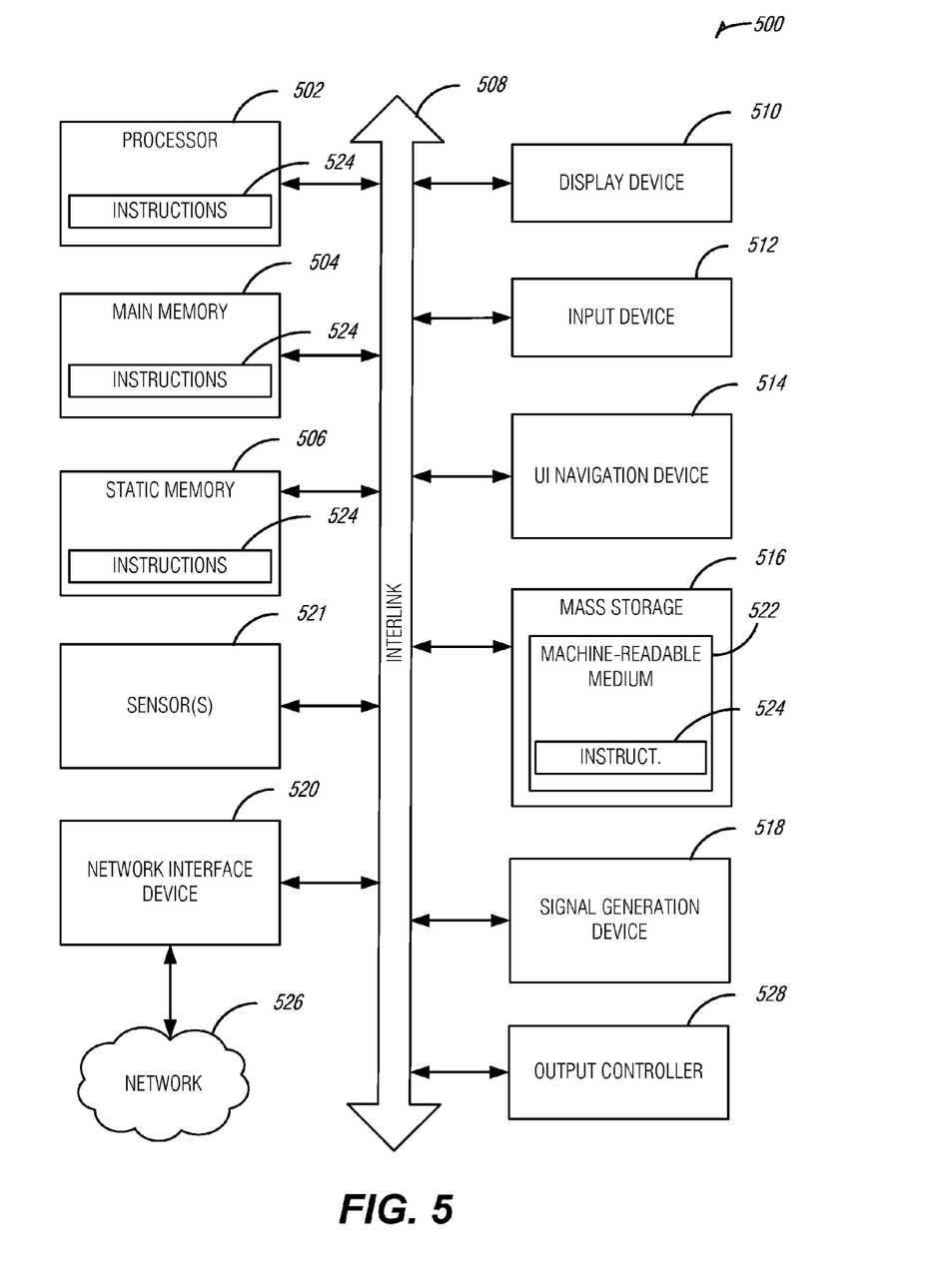
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES & EXAMPLES

Example 1 includes subject matter (such as a device, apparatus, or machine) comprising: a random number generator arranged to generate a back-off; a receive chain arranged to decode random access resource units from a frame in a sequence of frames, the frame transmitted to the STA from an access point (AP); a counter arranged to: be initialized to the back-off; and decrement for each random access resource unit decoded; a comparator arranged to: compare, for each decoded random access resource, a first transmission metric of a candidate random access resource in the frame with a second transmission metric of a current random access resource in the frame; and store the current random access resource with its transmission metric as the candidate random access resource when the second transmission metric is better than the first transmission metric; a thresholder arranged to determine whether the counter reached zero in the frame; and a transmit chain arrange to use the candidate random access resource, to communicate with the AP, after all random access resources in the frame are decoded when the thresholder determines that the counter reached zero.

In Example 2, the subject matter of Example 1 may include, wherein the receive chain is arranged to calculate the transmission metric when a random access resource unit is decoded.

In Example 3, the subject matter of any one of Examples 1 to 2 may include, wherein the transmission metric is a signal-to-noise ratio (SNR).

In Example 4, the subject matter of any one of Examples 1 to 3 may include, wherein the transmission metric is channel-state-information (CSI).

In Example 5, the subject matter of any one of Examples 1 to 4 may include, wherein the random access resource units are Orthogonal Frequency Division Multiple Access (OFDMA) sub-channels.

In Example 6, the subject matter of any one of Examples 1 to 5 may include, wherein the random access resource units are distinguishable from other resources units in the frame by an assigned association identification (AID).

In Example 7, the subject matter of any one of Examples 1 to 6 may include, wherein the random access resource units have an AID of zero.

In Example 8, the subject matter of any one of Examples 1 to 7 may include, wherein to generate the back-off includes the random number generator arranged to select an integer between zero and a predefined system value.

In Example 9, the subject matter of any one of Examples 1 to 8 may include, wherein the predefined system value is a contention window offset (CWO) attribute.

In Example 10, the subject matter of any one of Examples 1 to 9 may include, wherein, for a second frame that is earlier in the sequence of frames, the thresholder is arranged to determine that the counter did not reach zero in the second frame, and wherein the transmit chain is arranged to refrain from using any random access resource in the second frame to communicate with the AP.

Example 11 includes subject matter (such as a CRM) comprising: obtain a back-off; decode random access resource units from a frame in a sequence of frames, the frame transmitted to the STA from an access point (AP); decrement the back-off for each decoded random access frame; select the frame from the sequence of frames in response to the back-off reaching zero; select a random access resource unit, from the frame, that has a transmission metric more favorable than another random access resource unit of the frame; and use the random access resource unit to communicate with the AP.

In Example 12, the subject matter of Example 11 may include, wherein the transmission metric is calculated when a random access resource unit is decoded.

In Example 13, the subject matter of any one of Examples 11 to 12 may include, wherein the transmission metric is a signal-to-noise ratio (SNR).

In Example 14, the subject matter of any one of Examples 11 to 13 may include, wherein the transmission metric is channel-state-information (CSI).

In Example 15, the subject matter of any one of Examples 11 to 14 may include, wherein the random access resource units are Orthogonal Frequency Division Multiple Access (OFDMA) sub-channels.

In Example 16, the subject matter of any one of Examples 11 to 15 may include, wherein the random access resource units are distinguishable from other resources units in the frame by the assigned association identification (AID).

In Example 17, the subject matter of any one of Examples 11 to 16 may include, wherein the random access resource units have an AID of zero.

In Example 18, the subject matter of any one of Examples 11 to 17 may include, wherein to obtain the back-off includes the STA configured to select a random number.

In Example 19, the subject matter of any one of Examples 11 to 18 may include, wherein to select the random number includes the STA configured to select an integer between zero and a predefined system value.

In Example 20, the subject matter of any one of Examples 11 to 19 may include, wherein the predefined system value is a contention window offset (CWO) attribute.

In Example 21, the subject matter of any one of Examples 11 to 20 may include, wherein to select the random access resource unit in the frame that has the transmission metric more favorable than another random access resource unit of the frame includes the STA configured to: place a first random access resource unit decoded from the frame into a buffer with a corresponding transmission metric; and iterate through random access resource units in the frame, at each iteration: compare a transmission metric of a next random access resource unit of the frame to the transmission metric in the buffer; and overwrite the buffer with the next random access resource unit and the transmission metric of the next random access resource unit when the transmission metric of the next random access resource unit is better than the transmission metric in the buffer.

Example 22 includes subject matter (such as a method, means for performing acts, machine readable medium including instructions that when performed by a machine cause the machine to performs acts, or an apparatus to perform) comprising: obtaining a back-off; decoding random access resource units from a frame in a sequence of frames, the frame transmitted to the STA from an access point (AP); decrementing the back-off for each decoded random access frame; selecting the frame from the sequence of frames in response to the back-off reaching zero; selecting a random access resource unit, from the frame, that has a transmission metric more favorable than another random access resource unit of the frame; and using the random access resource unit to communicate with the AP.

In Example 23, the subject matter of Example 22 may include, wherein the transmission metric is calculated when a random access resource unit is decoded.

In Example 24, the subject matter of any one of Examples 22 to 23 may include, wherein the transmission metric is a signal-to-noise ratio (SNR).

In Example 25, the subject matter of any one of Examples 22 to 24 may include, wherein the transmission metric is channel-state-information (CSI).

In Example 26, the subject matter of any one of Examples 22 to 25 may include, wherein the random access resource units are Orthogonal Frequency Division Multiple Access (OFDMA) sub-channels.

In Example 27, the subject matter of any one of Examples 22 to 26 may include, wherein the random access resource units are distinguishable from other resources units in the frame by the assigned association identification (AID).

In Example 28, the subject matter of any one of Examples 22 to 27 may include, wherein the random access resource units have an AID of zero.

In Example 29, the subject matter of any one of Examples 22 to 28 may include, wherein obtaining the back-off includes selecting a random number.

In Example 30, the subject matter of any one of Examples 22 to 29 may include, wherein selecting the random number includes selecting an integer between zero and a predefined system value.

In Example 31, the subject matter of any one of Examples 22 to 30 may include, wherein the predefined system value is a contention window offset (CWO) attribute.

In Example 32, the subject matter of any one of Examples 22 to 31 may include, wherein selecting the random access resource unit in the frame that has the transmission metric more favorable than another random access resource unit of the frame includes: placing a first random access resource unit decoded from the frame into a buffer with a corresponding transmission metric; and iterating through random access resource units in the frame, at each iteration: comparing a transmission metric of a next random access resource unit of the frame to the transmission metric in the buffer; and overwriting the buffer with the next random access resource unit and the transmission metric of the next random access resource unit when the transmission metric of the next random access resource unit is better than the transmission metric in the buffer.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for a wireless station (STA) to enable random access to a wireless network, the STA comprising:
    a random number generator arranged to generate a back-off;
    a receive chain arranged to decode random access resource units from a frame in a sequence of frames, the frame transmitted to the STA from an access point (AP);
    a counter arranged to:
        be initialized to the back-off; and
        decrement for each random access resource unit decoded;
    a comparator arranged to:

compare, for each decoded random access resource, a first transmission metric of a candidate random access resource in the frame with a second transmission metric of a current random access resource in the frame; and store the current random access resource with its transmission metric as the candidate random access resource when the second transmission metric is better than the first transmission metric;

a thresholder arranged to determine whether the counter reached zero in the frame; and a transmit chain arrange to use the candidate random access resource, to communicate with the AP, after all random access resources in the frame are decoded when the thresholder determines that the counter reached zero.

2. The device of claim 1, wherein the receive chain is arranged to calculate the transmission metric when a random access resource unit is decoded.

3. The device of claim 1, wherein the transmission metric is a signal-to-noise ratio (SNR).

4. The device of claim 1, wherein the transmission metric is channel-state-information (CSI).

5. The device of claim 1, wherein the random access resource units are Orthogonal Frequency Division Multiple Access (OFDMA) sub-channels.

6. The device of claim 1, wherein the random access resource units are distinguishable from other resources units in the frame by an assigned association identification (AID).

7. The device of claim 6, wherein the random access resource units have an AID of zero.

8. The device of claim 7, wherein to generate the back-off includes the random number generator arranged to select an integer between zero and a predefined system value.

9. The device of claim 8, wherein the predefined system value is a contention window offset (CWO) attribute.

10. The device of claim 1, wherein, for a second frame that is earlier in the sequence of frames, the thresholder is arranged to determine that the counter did not reach zero in the second frame, and wherein the transmit chain is arranged to refrain from using any random access resource in the second frame to communicate with the AP.

11. At least one non-transitory machine readable medium including instructions that, when executed by a wireless station (STA), configure the STA to:

obtain a back-off;

decode random access resource units from a frame in a sequence of frames, the frame transmitted to the STA from an access point (AP);

decrement the back-off for each decoded random access frame;

select the frame from the sequence of frames in response to the back-off reaching zero;

compare a transmission metric of random access resource units from the frame to identify a first random access resource unit that has a better transmission metric than a second random access resource unit;

select the first random access resource unit based on the comparison; and use the random access resource unit to communicate with the AP.

12. The at least one machine readable medium of claim 11, wherein the transmission metric is calculated when a random access resource unit is decoded.

13. The at least one machine readable medium of claim 11, wherein the random access resource units are Orthogonal Frequency Division Multiple Access (OFDMA) sub-channels.

14. The at least one machine readable medium of claim 11, wherein to obtain the back-off includes the STA configured to select a random integer between zero and a predefined system value that is a contention window offset (CWO) attribute.

15. The at least one machine readable medium of claim 11, wherein, to compare the transmission metric of random access resource units from the frame to identify the first random access resource unit that has a better transmission metric than the second random access resource unit, the STA is configured to:

place the first random access resource unit decoded from the frame into a buffer with a transmission metric value corresponding to the first random access resource unit; and iterate through random access resource units in the frame, at each iteration:

compare a transmission metric value of a next random access resource unit of the frame to the transmission metric value in the buffer; and overwrite the buffer with the next random access resource unit and the transmission metric value of the next random access resource unit when the transmission metric value of the next random access resource unit is better than the transmission metric value in the buffer.

16. A method for random access to wireless network, the method comprising:

obtaining a back-off;

decoding random access resource units from a frame in a sequence of frames, the frame transmitted to the STA from an access point (AP);

decrementing the back-off for each decoded random access frame;

selecting the frame from the sequence of frames in response to the back-off reaching zero;

comparing a transmission metric of random access resource units from the frame to identify a first random access resource unit that has a better transmission metric than a second random access resource unit;

selecting the first random access resource unit based on the comparing; and using the random access resource unit to communicate with the AP.

17. The method of claim 16, wherein the random access resource units are Orthogonal Frequency Division Multiple Access (OFDMA) sub-channels.

18. The method of claim 16, wherein the random access resource units are distinguishable from other resources units in the frame by the assigned association identification (AID).

19. The method of claim 18, wherein the random access resource units have an AID of zero.

20. The method of claim 16, wherein comparing the transmission metric of random access resource units from the frame to identify the first random access resource unit that has a better transmission metric than the second random access resource unit includes:

placing the first random access resource unit decoded from the frame into a buffer with a transmission metric value corresponding to the first random access resource unit; and iterating through random access resource units in the frame, at each iteration:
  comparing a transmission metric value of a next random access resource unit of the frame to the transmission metric value in the buffer; and
  overwriting the buffer with the next random access resource unit and the transmission metric value of the next random access resource unit when the transmission metric value of the next random access resource unit is better than the transmission metric value in the buffer.

* * * * *